(12) United States Patent
Nguyen et al.

(10) Patent No.: US 7,758,954 B2
(45) Date of Patent: Jul. 20, 2010

(54) COATED SUBSTRATE HAVING ONE OR MORE CROSS-LINKED INTERFACIAL ZONES

(75) Inventors: Van Ngoc Nguyen, Lake Forest, CA (US); Caidian Luo, Alta Loma, CA (US); Weiling Peng, Rancho Cucamonga, CA (US)

(73) Assignee: James Hardie Technology Limited, Dublin (IE)

( * ) Notice: Subject to any disclaimer, the term of this patent is extended or adjusted under 35 U.S.C. 154(b) by 360 days.

(21) Appl. No.: 11/208,433

(22) Filed: Aug. 18, 2005

(65) Prior Publication Data

US 2007/0042192 A1 Feb. 22, 2007

(51) Int. Cl.
*B32B 5/18* (2006.01)
*B32B 27/38* (2006.01)

(52) U.S. Cl. ............... 428/308.4; 428/306.6; 428/307.3; 428/312.2; 428/312.4; 428/317.9; 428/413

(58) Field of Classification Search ........................ None
See application file for complete search history.

(56) References Cited

U.S. PATENT DOCUMENTS

| | | | |
|---|---|---|---|
| 3,931,448 A | 1/1976 | Parkinson | |
| 4,143,188 A * | 3/1979 | Huber-Nuesch et al. | .... 427/386 |
| 4,226,277 A | 10/1980 | Matalon | |
| 4,246,148 A * | 1/1981 | Shimp et al. | ................. 523/400 |
| 4,759,961 A | 7/1988 | Kato et al. | |
| 5,059,264 A | 10/1991 | Sheets | |
| 5,087,405 A | 2/1992 | Maker | |
| 5,162,407 A * | 11/1992 | Turner | ......................... 524/108 |
| 5,445,754 A | 8/1995 | Nelson | |
| 5,681,877 A | 10/1997 | Hosotte-Filbert et al. | |
| 5,688,642 A | 11/1997 | Chrisey et al. | |
| 6,068,885 A * | 5/2000 | Hartman et al. | ............. 427/386 |
| 6,069,217 A | 5/2000 | Nae et al. | |
| 6,376,570 B1 | 4/2002 | Zhao et al. | |
| 6,376,579 B1 * | 4/2002 | Mishra et al. | ................ 523/466 |
| 6,395,804 B1 | 5/2002 | Rao et al. | |
| 6,420,479 B1 | 7/2002 | Phan et al. | |
| 6,572,927 B1 * | 6/2003 | Pleyers et al. | ............ 427/393.6 |
| 6,680,111 B1 | 1/2004 | Leibler et al. | |
| 6,710,112 B1 | 3/2004 | Sandor et al. | |
| 6,933,415 B2 | 8/2005 | Zhao et al. | |
| 7,041,727 B2 | 5/2006 | Kubicek et al. | |
| 7,235,595 B2 | 6/2007 | Hermes et al. | |
| 2001/0051227 A1 | 12/2001 | Jung et al. | |
| 2001/0053449 A1 | 12/2001 | Parekh et al. | |
| 2002/0061940 A1 | 5/2002 | Lach et al. | |
| 2002/0072562 A1 | 6/2002 | Asthana | |
| 2002/0077397 A1 | 6/2002 | Karuga et al. | |
| 2002/0081437 A1 | 6/2002 | Dargontina et al. | |
| 2002/0136900 A1 | 9/2002 | Mallen | |
| 2002/0150689 A1 | 10/2002 | Seibel et al. | |
| 2002/0156163 A1 | 10/2002 | Brandenburger et al. | |
| 2002/0169271 A1 | 11/2002 | Peng et al. | |
| 2002/0171170 A1 | 11/2002 | DeMasi et al. | |
| 2003/0054176 A1 | 3/2003 | Pantano et al. | |
| 2003/0088014 A1 | 5/2003 | Edwards et al. | |
| 2003/0158351 A1 | 8/2003 | Smith et al. | |
| 2003/0207035 A1 | 11/2003 | Schmid et al. | |
| 2003/0236340 A1 | 12/2003 | Kubicek et al. | |
| 2004/0005455 A1 * | 1/2004 | Stephenson et al. | ..... 428/355 EP |
| 2004/0081706 A1 | 4/2004 | Trainer et al. | |
| 2005/0043446 A1 | 2/2005 | Bochan et al. | |
| 2005/0058689 A1 | 3/2005 | McDaniel | |
| 2005/0192400 A1 | 9/2005 | Killilea et al. | |
| 2005/0196629 A1 | 9/2005 | Bariatinsky et al. | |
| 2005/0214550 A1 | 9/2005 | Kawamura | |
| 2005/0215708 A1 | 9/2005 | Robertson | |
| 2005/0227100 A1 | 10/2005 | Brandenburger et al. | |
| 2005/0238898 A1 | 10/2005 | Wind et al. | |
| 2006/0003159 A1 | 1/2006 | Hayes et al. | |
| 2006/0029825 A1 | 2/2006 | Chen et al. | |
| 2006/0036056 A1 | 2/2006 | Wu et al. | |
| 2006/0105161 A1 | 5/2006 | Brandenburger et al. | |
| 2006/0111503 A1 | 5/2006 | Killilea et al. | |
| 2006/0122330 A1 | 6/2006 | Wu et al. | |
| 2006/0135684 A1 | 6/2006 | Killilea | |
| 2006/0135686 A1 | 6/2006 | Killilea et al. | |

(Continued)

FOREIGN PATENT DOCUMENTS

AU 515151 3/1981

(Continued)

OTHER PUBLICATIONS

U.S. Appl. No. 12/163,739, filed Jun. 27, 2008 entitled "PAINT"—Inventor: Richard Lazarus et al.

(Continued)

*Primary Examiner*—Marc S Zimmer
(74) *Attorney, Agent, or Firm*—Gardere Wynne Sewell, LLP

(57) ABSTRACT

A coated substrate is configured with one or more cross-linked interfacial zones provided to improve the adhesion between the coating and substrate of the article or between adjacent coating layers. The coating composition contains molecules having at least two reactive functional groups capable of reacting with cross-linking molecules in the substrate and/or molecules in adjacent coating layers. The cross-linked interfacial zones improve the adhesion between coatings and the substrate and between adjacent coating layers.

21 Claims, 2 Drawing Sheets

U.S. PATENT DOCUMENTS

| | | |
|---|---|---|
| 2006/0141261 A1 | 6/2006 | Wind et al. |
| 2006/0167208 A1 | 7/2006 | Garner et al. |
| 2006/0182946 A1* | 8/2006 | Zarb et al. ............... 428/312.4 |
| 2006/0202161 A1 | 9/2006 | Share et al. |
| 2006/0207476 A1 | 9/2006 | Coward et al. |
| 2006/0210153 A1 | 9/2006 | Sara et al. |
| 2007/0001343 A1 | 1/2007 | Pulman et al. |
| 2007/0010612 A1 | 1/2007 | Rouge et al. |
| 2007/0027249 A1 | 2/2007 | Killilea |
| 2007/0036903 A1 | 2/2007 | Mayr et al. |
| 2007/0045891 A1 | 3/2007 | Martinoni et al. |
| 2007/0054140 A1 | 3/2007 | Mayr et al. |
| 2007/0065608 A1 | 3/2007 | Niederst |
| 2007/0087146 A1 | 4/2007 | Evans et al. |
| 2007/0110933 A1 | 5/2007 | Share et al. |
| 2007/0110981 A1 | 5/2007 | Killilea et al. |
| 2007/0117928 A1 | 5/2007 | O'Brien et al. |
| 2007/0132158 A1 | 6/2007 | Martinoni et al. |
| 2007/0154643 A1 | 7/2007 | Schmid et al. |
| 2007/0169843 A1 | 7/2007 | Henderleiter |
| 2007/0178239 A1 | 8/2007 | Kestell et al. |
| 2007/0178294 A1 | 8/2007 | Dargontina et al. |
| 2007/0259166 A1 | 11/2007 | Killilea et al. |
| 2007/0259188 A1 | 11/2007 | Wu et al. |
| 2007/0269660 A1 | 11/2007 | Killilea et al. |
| 2007/0269668 A1 | 11/2007 | Hayes et al. |
| 2007/0275198 A1 | 11/2007 | Share et al. |
| 2007/0282046 A1 | 12/2007 | Killilea et al. |
| 2008/0008895 A1 | 1/2008 | Garner et al. |
| 2008/0009601 A1 | 1/2008 | Killilea et al. |
| 2008/0041003 A1 | 2/2008 | Nowak et al. |
| 2008/0096024 A1 | 4/2008 | Cavallin |
| 2009/0004468 A1 | 1/2009 | Chen et al. |
| 2009/0005484 A1 | 1/2009 | Lazarus et al. |

FOREIGN PATENT DOCUMENTS

| | | | |
|---|---|---|---|
| DE | 1958706 | * | 11/1969 |
| EP | 469 295 A2 | * | 5/1992 |
| JP | 10-279831 | * | 10/1998 |
| JP | 2000-327453 | * | 11/2000 |
| JP | 2000327453 A | | 11/2000 |
| WO | WO-98/45222 | | 10/1998 |
| WO | WO-01/68547 | | 9/2001 |
| WO | WO-02/28795 | | 4/2002 |
| WO | WO-02/28796 | | 4/2002 |
| WO | WO 2004/087412 | * | 10/2004 |
| WO | WO-2007022449 | | 2/2007 |
| WO | WO-2009006304 | | 1/2009 |
| WO | WO-2009006324 | | 1/2009 |
| WO | WO-2009006333 | | 1/2009 |

OTHER PUBLICATIONS

U.S. Appl. No. 12/163,452, filed Jun. 27, 2008 entitled "Primer for Composite Building Materials"—Inventor: Yongjun Chen et al.

U.S. Appl. No. 12/163,541, filed Jun. 27, 2008 entitled "Multifunctional Primers"—Inventor: Caidian Luo et al.

International Patent Application #PCT/US2008/068637 filed Jun. 27, 2008 entitled "PAINT".

International Patent Application #PCT/US2008/068586 filed Jun. 27, 2008 entitled "Primer for Composite Building Materials".

International Patent Application #PCT/US2008/068626 filed Jun. 27, 2008 entitled "Multifunctional Primers".

Omya, Inc. Omyacarb 5-FL Product Data Sheet (Nov. 20, 2006) Online at: www.omyana.com/B2BShrtPr.nsf/(alldocs)/5A3467E5925784DB85256FA900509F1C/$FILE/OMYACARB%205%20-%20FL.pdf.

Schrickel, Jorg. (Feb 1, 2000) "Efficiency and compatability in one polysiloxane antifoam—even the side effects are . . . " Allbusiness.com. Available Online at: www.allbusiness.com/manufacturing/chemical-manufacturing-paint/462854-1.html.

* cited by examiner

COATED SUBSTRATE HAVING ONE OR MORE CROSS-LINKED INTERFACIAL ZONES

BACKGROUND OF THE INVENTION

1. Field of the Invention

This invention generally relates to substrates with surface coatings, in particular to a coated substrate having one or more cross-linked interfacial zones formed to improve coating adhesion.

2. Description of the Related Art

Various coating systems have been developed to protect surfaces such as that of building materials from the detrimental effects of handling and environmental exposure. Protective and decorative coatings such as sealers, primers, tie coats, topcoats, color coats, and clear coats are well known. Typically, coatings are applied to solid substrates as liquids or powders and subsequently cured by moisture, heat, light, irradiation and/or chemical initiators. The coatings are usually applied in multiple layers, with each of the layers often having different chemical compositions and properties.

Disadvantageously, conventional coating systems for building materials often suffer from drawbacks such as poor adhesion. For example, the interfacial bond strength between paint and a cementitious building article is often less than ideal, which can result in overall paint failure. Moreover, the adhesion between adjacent coating layers on a building article is also often weak, which can cause paint layer separation. It is thus an object of the present invention to provide a system and method of manufacturing a coated substrate which overcomes or ameliorates one or more of the disadvantages of the prior art.

SUMMARY OF THE INVENTION

In one aspect, the preferred embodiments of the present invention provide a composite building article comprising a substrate containing hydroxyl functional groups, a first composition coated over at least a portion of the substrate, wherein a portion of the first composition extends into a subsurface region of the substrate. Preferably, the first composition comprises a plurality of cross-linking molecules wherein each molecule has at least two reactive functional groups, each functional group being capable of forming chemical bonds with the hydroxyl functional groups in the substrate. The building article further includes a cross-linked interfacial zone comprising an interlocking matrix formed in the subsurface region of the substrate. Preferably, the interlocking matrix is comprised of hydroxyl functional groups in the subsurface region bonded to and cross-linked by the cross-linking molecules in the portion of the first composition extending into the subsurface region. In one embodiment, the cross-linking molecule in the composition can be selected from the group consisting of vinylalkoxy silane, epoxy-tertiary amine, epoxy, metal complexity compounds, glycidoxypropyltrimethoxysilane, carboxylic acid, hydroxyl-carboxylic acid, and combinations thereof. In another embodiment, the building article further includes a second composition coated over at least a portion of the first composition. Preferably, a second cross-linked interfacial zone is formed between the first and second compositions wherein molecules in the second composition are bonded to and cross-linked by the cross-linking molecules in the first composition.

In another aspect, the preferred embodiments of the present invention provide a composite building article having a first zone which comprises predominantly cement, a second zone which comprises predominantly a coating material, and an interfacial zone interposed therebetween. The interfacial zone preferably comprises an interlocking matrix formed of the coating material and the cement. Preferably, the coating material comprises molecules, each having at least two functional groups, wherein the functional groups on the molecules bond with hydroxyl functional groups in the cement to form cross-linked bonds in the cement. In one embodiment, the coating material further comprises at least one secondary functional group which forms cross-linking bonds with subsequent coating layers. In another embodiment, the coating material comprises a basecoat and a topcoat.

In yet another aspect, the preferred embodiments of the present invention provide a method of forming a building article. The method comprises applying a coating material to a hydroxyl-group containing substrate, wherein the coating material extends into the substrate in a controlled manner, and curing the coating material in the substrate to as to form a three-dimensional network of hydroxyl groups cross-linked by the coating material. The hydroxyl group containing substrate includes fiber reinforced cement composite building products such as siding, roofing, fencing, trim, fascia, pipes, decking, and tile underlayment.

DETAILED DESCRIPTION OF THE PREFERRED EMBODIMENTS

Figure 1:
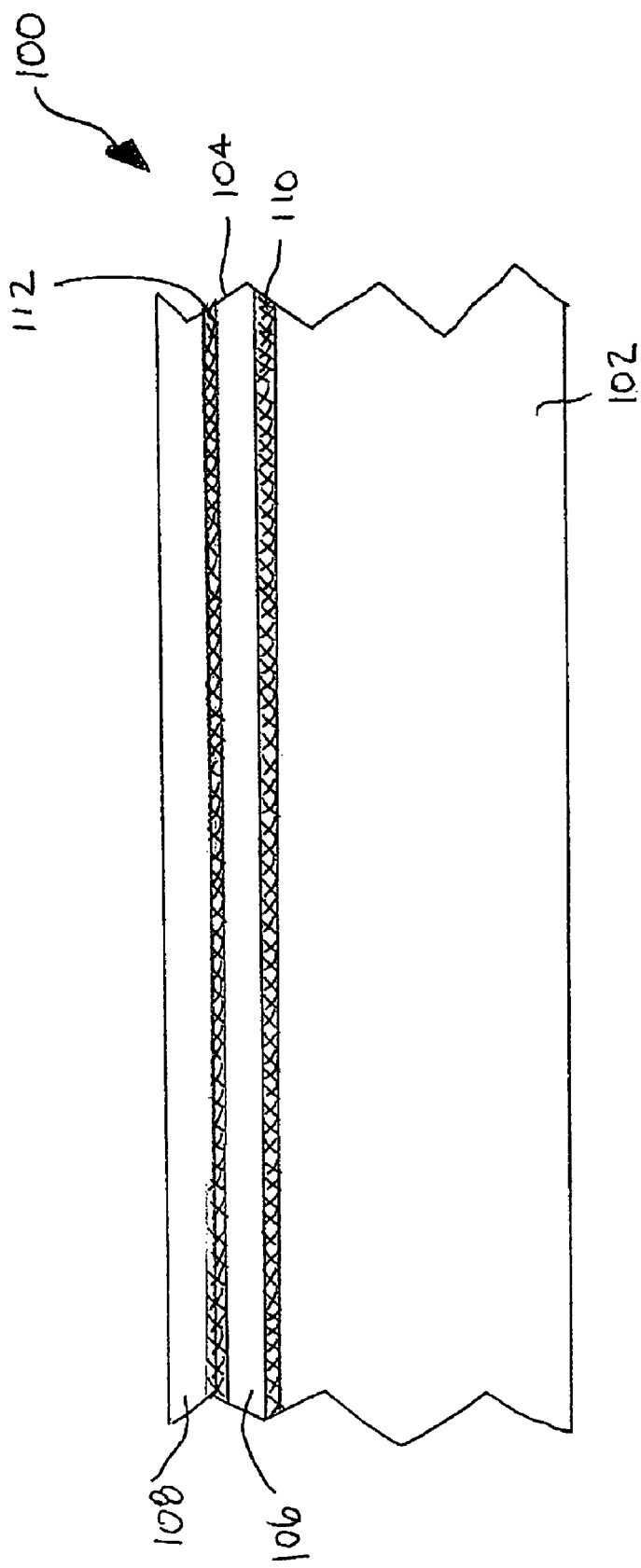
FIG. 1 is a cross sectional view of a coated composite building article of one preferred embodiment, showing a first cross-linked interfacial zone formed between the substrate and exterior coating of the building article, and a second cross-linked interfacial zone formed by coating layers.

As used herein, the term "cross-linked" shall refer to two or more molecules or functional groups that are linked together by bonding to cross-linking agents which extend between the molecules or functional groups. The cross-linked functional groups could be on neighboring molecules or on the same molecule. The term "cross-linking agent" or "cross-linking molecule" shall refer to a molecule having at least two reactive functional groups, whereby each functional group bonds to a different molecule or functional group to link together the molecules or functional groups.

Certain preferred embodiments of the present invention provide a coated composite building article having one or more cross-linked interfacial zones formed to improve coating adhesion. In one embodiment, a first cross-linked interfacial zone is formed at the interface between the substrate of the building article and a basecoat layer. In the first cross-linked interfacial zone, a portion of the molecules in the substrate are bonded to and cross-linked by components in the basecoat. In another embodiment, a second cross-linked interfacial zone is formed at the interface between the basecoat layer and a topcoat layer. In the second cross-linked interfacial zone, a portion of the molecules in the topcoat layer are bonded to and cross-linked by components in the basecoat layer.

The building article substrate can include a variety of different materials, including but not limited to, organic polymers, inorganic polymers, woods, papers, cardboards, cements, fiber reinforced cement composite materials, and the like. In some preferred embodiments, the building article substrate contains hydroxyl functional groups and the basecoat components have primary functional groups which form covalent bonds with the hydroxyl functional groups in the substrate, thereby linking together neighboring hydroxyl groups. In one embodiment, the basecoat components contain at least two, preferably three or more, chemical functional groups per molecule that are capable of reacting with hydroxyl groups in the substrate. The basecoat-substrate reaction can be a condensation or an addition reaction, and the reaction can proceed at ambient conditions, and/or under heat, and/or under irradiation, and/or with catalysts. The basecoat-substrate reaction enhances not only the adhesion and durability of the basecoat, but also the structural integrity of the topcoat layer on the solid substrate.

In practice, a portion of the basecoat preferably extends into the pores and interstices of the substrate so that the components contained therein can react with molecules in the substrate. In some embodiments, the basecoat contains small particles that can penetrate into the substrate to also form a mechanical interlocking after curing. The cross-linking reaction between the basecoat and the substrate plus the mechanical interlocking can significantly increase the interfacial bond strength between the basecoat and the substrate.

In other embodiments, the components in the basecoat may also contain at least one, preferably two or more, secondary functional groups per molecule that are capable of reacting with molecules in the topcoat. The topcoat may or may not contain functional group(s) reactive with the hydroxyl groups of the substrate. Examples of the top-basecoat reaction include a radical graft polymerization reaction, a condensation-type reaction or an addition-type reaction.

In certain implementations, the cross-linked interfacial zones provide an interlocking matrix extending between the basecoat layer and the substrate and between the basecoat and the topcoat layers. The resultant coating is one unified, three-dimensional network from the bulk solid substrate to the top coating layer that demonstrates superior adhesion and durability.

FIG. 1 schematically illustrates a cross sectional view of a coated composite building article 100 of one preferred embodiment of the present invention. As shown in FIG. 1, the building article 100 generally includes a substrate 102 which is formed of predominantly fiber cement, an exterior coating 104 which is formed of a basecoat 106 and a topcoat 108, a first cross-linked interfacial zone 110 interposed between the substrate 102 and the basecoat 106, and a second cross-linked interfacial zone 112 interposed between the basecoat 106 and the topcoat 108.

The substrate 102 of the composite building article 100 in FIG. 1 is preferably porous and/or hydrophilic. The substrate can be made of a variety of different materials such as a low density fiber cement board having a porosity of about 40%-80% by volume, a medium density fiber cement board having a porosity of about 20-40% by volume, or a high density/compressed fiber cement board having a porosity of about 2%-20% by volume. As will be described in greater detail below, the porosity of the substrate can also be modified by mechanical or chemical treatment to control the formation of the cross-linked interfacial zone 110. The substrate can be sanded, machined, chemically etched, or treated with additives such as silane, polysiloxanes and the like. In some embodiments, the substrate 102 also incorporates low density fillers such as microspheres, preferably about 4%-50% by weight, more preferably about 5%-10% by weight. A variety of different fiber cement compositions and methods of making fiber cement substrates can be used for these applications, such as those described in Australian Patent AU515151, PCT Application WO 0168547, and PCT Application WO 9845222, which are hereby incorporated by reference in their entirety.

In the first cross-linked interfacial zone 110, the basecoat 106 illustrated in FIG. 1 preferably interpenetrates the voids and interstices in the fiber cement and mechanically interlocks with the fiber cement to form a subsurface three-dimensional network, which improves the basecoat-substrate adhesion and provides an effective barrier to the ingress of environmental agents. A portion of the basecoat 106 is capable of cross-linking the hydroxyl functional groups present in the cement and/or the reinforcement fibers in the substrate 102. In one embodiment, the cross-linked interfacial zone 110 is between about 0 and 50 microns thick. In another embodiment, the cross-linked interfacial zone 110 is between about 10 and 50 microns thick. The cross-linked interfacial zone 110 in the substrate 102 improves the overall coating adhesion and durability, making the finished board much less susceptible to degradation and damage as compared to conventional protective coatings formed on the exterior surfaces of building articles.

As FIG. 1 further illustrates, the second cross-linked interfacial zone 112 is formed at the interface between the basecoat 106 and the topcoat 108. The second cross-linked interfacial zone 112 preferably includes a plurality of molecules in the topcoat 108 that are cross-linked by cross-linking agents in the basecoat 106, thereby forming a three-dimensional matrix comprising the basecoat and the topcoat. In one embodiment, the second cross-linked interfacial zone 112 is between about 0 and 50 microns thick. In another embodiment, the second cross-linked interfacial zone 112 is between about 10 and 50 microns thick. The second cross-linked interfacial zone 112 enhances the adhesion between the basecoat and the topcoat. It will also be appreciated that the above-described inventive concept is not limited to basecoats and topcoats. It is applicable to a variety of different types and layers of coatings.

As will be described in greater detail below, the cross-linked interfacial zones in the fiber cement article can be formed by a number of different methods including but not limited to applying in a controlled manner a coating as a dispersion or solution into a cured fiber cement matrix.

Figure 2:
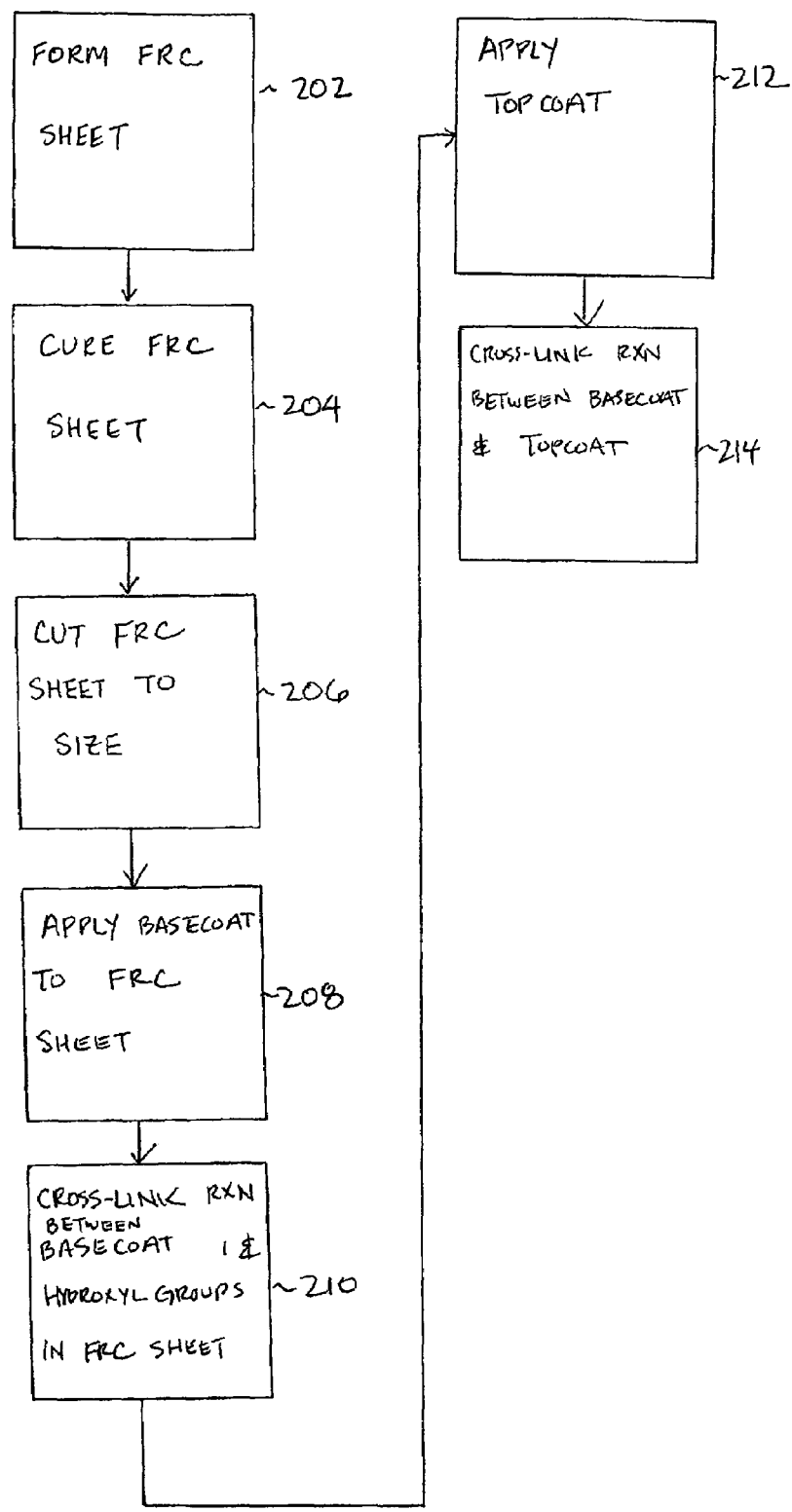
FIG. 2 is a flow chart illustrating a process of forming the coated composite building article of FIG. 1.

FIG. 2 illustrates a process 200 for manufacturing a composite building article of a preferred embodiment of the present invention. In this illustration, the composite building article is a fiber cement sheet. As shown in FIG. 2, the process 200 begins with step 202 in which a FRC green sheet is manufactured in accordance with known fiber cement compositions and manufacturing techniques. In one embodiment, the fiber cement composition used generally falls within the ranges set out in Table 1 below.

TABLE 1

FORMULATION FOR FIBER REINFORCED CEMENT COMPOSTE MATERIAL OF CERTAIN EMBODIMENTS

| Dry Ingredients (generic) | Dry Ingredients (a preferred embodiment) | Acceptable range (% by dry weight) | A preferred range (% by dry weight) |
|---|---|---|---|
| Binder | Cement | 20-75% | 25-50% |
| Aggregate | Silica | 30-70% | 40-60% |
| Fiber | Cellulose pulp | 0-15% | 6-12% |
| Additives | Alumina | 1-5% | 2-4% |

The cement is typically ordinary Portland cement type 1 and the silica can be milled quartz, preferably around 200 mesh, or any suitable siliceous material that alone, or in combination, yields properties substantially equivalent thereto. Examples of suitable siliceous materials include, but are not limited to, amorphous silica, diatomaceous earth, rice hull ash, blast furnace slag, granulated slag, steel slag, mineral oxides, mineral hydroxides, clays, magnasite or dolomite, polymeric beads, metal oxides and hydroxides, or mixtures thereof.

Preferred fibers include various forms of cellulose fibers including Kraft and sulfite pulps, bleached and unbleached wood and non-wood cellulosic fibers, pulps in rolls, bales, fiberized (by hammermilled or refining). However, it will be appreciated that other forms of fibers may be used. In a particularly preferred embodiment, the fiber is cellulose wood pulp. Other examples of suitable fibers are ceramic fiber, glass fiber, mineral wool, steel fiber, and synthetic polymer fibers such as polyamides, polyester, polypropylene, polymethylpentene, polyacrylonitrile, polyacrylamide, viscose, nylon, PVC, PVA, rayon, glass ceramic, carbon, or any mixtures thereof. The fibers can also include engineered cellulose fibers such as those disclosed in PCT Patent Application WO 0228796 and WO 0228795, which are hereby incorporated by reference in their entirety.

It should also be noted that additional additives can be optionally incorporated into the fiber cement composition including but not limited to density modifiers, dispersing agents, silica fume, geothermal silica, fire retardant, biocides, thickeners, pigments, colorants, dispersants, foaming agents, flocculating agents, water-proofing agents, organic density modifiers, aluminum powder, kaolin, alumina trihydrate, mica, metakaolin, calcium carbonate, wollastonite, polymeric resin emulsions, or mixtures thereof.

In one preferred method, the sheets are produced using the Hatschek process. As it is generally known in the art, the Hatschek process uses a rotating drum sieve arrangement to deposit a plurality of zones of de-watered slurry onto an absorbent conveyer until the desired sheet thickness has been achieved. However, it will be appreciated that the greens sheets can also be produced using other known methods such as extrusion, mazza, magnani and roll pressed processes. The green sheets are subsequently cured in Step 204. The curing can be carried out in an autoclave or using any number of other conventional techniques including air curing.

When curing has been completed, the sheets are typically cut to size in Step 206 and in certain implementations, the edges are finished by passing through a conventional sheet finishing line in where they are optionally trimmed to size with an edge router to exact dimensions. The finished fiber-cement sheets are placed in a stack as they come off the sheet finishing line.

In Step 208, a basecoat composition is applied to an exterior surface of each fiber-cement sheet. A portion of the basecoat composition extends from the exterior surface into the fiber cement matrix, fills the voids and interstices therein, and directly contacts the fiber cement. In some preferred forms of the invention, the basecoat composition is applied to all six sides of the finished fiber-cement sheet (the front face and mounting face being the two major faces, and the four edges). This may be done by first manually roll coating or spraying the basecoat on the edges of the stack of fiber-cement sheets and then individually roll coating the basecoat on the face and back of an fiber-cement sheet using a conventional roll coater. Alternatively, the basecoat composition may be applied by other conventional methods such as spraying, vacuum, direct roller coating, flood coating, brush coating, curtain coating or powder coating. Preferably, the coating thickness is in the range of about 5 to 50 microns.

In one embodiment, the basecoat composition comprises a vinylalkoxy silane sealer and a water-based acrylic latex topcoat. In another embodiment, the basecoat composition consists essentially of a vinylalkoxy silane sealer and a water-based acrylic latex topcoat. In yet another embodiment, the basecoat composition comprises a dilute citric acid pre-sealer and a styrene-acrylic latex sealer. In certain embodiments, the basecoat composition consists essentially of a dilute citric acid pre-sealer and a styrene-acrylic latex sealer. In other embodiment, the basecoat composite can comprise a carboxylic acid pre-sealer and/or a citric acid pre-sealer.

In preferred embodiments, the basecoat composition is applied directly to the fiber cement surface and allowed to migrate in a controlled manner into the fiber-cement sheet or substrate to form the cross-linked interfacial zone. In certain embodiments, a continuous, defect free film is applied to the fiber cement in a single pass. In other embodiments, the surface of the fiber-cement sheet is further treated to facilitate controlled migration of the basecoat composition. Mechanical and chemical treatments can also be applied to affect the porosity of the substrate which in turn affects the migration of the basecoat component into the substrate. The surface of the fiber cement can be sanded, machined, chemically etched prior to application of the cross-linking agent, which can have the effect of increasing the thickness and improving the uniformity of the cross-linked interfacial zone.

As also shown in FIG. 2, the process 200 continues with Step 210 in which a portion of the basecoat composition that extends into the fiber cement sheet or substrate reacts with the hydroxyl groups in the substrate to cross-link the hydroxyl groups and the molecules associated therewith. In one embodiment, the basecoat composition is formulated such that molecules in the basecoat act as cross-linking agents that bond to and interconnect the hydroxyl functional groups in the substrate, thus forming a cross-linked interfacial zone between the substrate and the basecoat. The cross-linking reactions can be self-triggered, or triggered by heat, moisture, radiation, or other methods.

In certain preferred embodiments, the process 200 continues with Step 212 in which a topcoat is applied to the basecoat composition using methods know in the art. In one embodiment, a paint layer is applied to an upper surface of the basecoat composition using methods such as spraying, vacuum, direct roller coating, flood coating, brush coating, curtain coating or roll coating. Preferably, the topcoat contains molecules or functional groups that can be cross-linked by cross-linking agents in the basecoat composition. In one embodiment, a portion of the topcoat extends into the basecoat and molecules therein are cross-linked in step 214 by cross-linking agents present in the basecoat, thus forming a second cross-linked interfacial region. In certain embodiments, Steps 210 and 214 can be performed simultaneously after both the basecoat composition and topcoat have been applied to the FRC substrate.

The preferred embodiments of the present invention will be further described with reference to the following illustrative Examples.

EXAMPLE 1

Coating Composition Cross-Linkable to Fiber Reinforced Cement Substrate. The Coating Composition Comprises a Vinyalkoxy Silane Sealer and a Water-Based Acrylic Latex Topcoat Example 1 illustrates a coating composition of one preferred embodiment cross-linkable to fiber reinforced cement composites and also a method of applying the cross-linkable coating composition onto fiber cement substrates. The coating composition comprised a vinylalkoxy silane sealer and a water-based acrylic latex topcoat. The vinylalkoxy silane sealer was vinyltriethoxymethoxy silane at about 100% solids obtained from Gelest, Inc. The water-based acrylic latex topcoat was acrylic ColorPlus obtained from Valspar Corporation with the addition of a 2,5-dimethyl-2,5-di-(2-ethylhexanoylperoxy) hexane liquid radical initiator, Trigonox 141 obtained from Akzo Nobel Polymer Chemicals LLC. Trigonox 141 was added at about 1-2% relative to the acrylic latex resin, which contained about 50-54% solids. The acrylic topcoat also contained about 2-4% of a polycarbodiimide crosslinker.

Fiber reinforced cement sample boards precut to 3" by 3", pre-equilibrated to a board moisture content of about 18-22% and preheated to a board temperature of about 130-140 F, were sealed with vinyltriethoxymethoxy silane at a film thickness of about 0.7-1.0 mils. The amount of sealer was adjusted on an analytical balance with a precision of ±0.01 g. Subsequently, sealed samples were cured at room conditions for 24 hours to bond/crosslink vinyltriethoxymethoxy silane to the fiber cement substrate. After the 24-hour period, vinyltriethoxymethoxy silane sealed fiber cement boards were then top coated with two layers of acrylic coating to achieve a dry film thickness of about 1 mil. The first topcoat layer was cured in a fanned oven until the board surface temperature reached about 120-140 F, whereas the second topcoat layer was cured until the board surface temperature reached about 170-180 F. Heat cure was employed to speed up the self cross-linking reaction between acrylic polymer chain and also to facilitate the radical graft co-polymerization reaction between the vinyltriethoxymethoxy silane sealer and the acrylic topcoat. Once the coating was completed, coated boards were allowed to further equilibrate/cure at room temperature conditions for and additional 24 hours between inspections/tests.

24 hours after curing the coatings were fully dry and non-tacky. Under a microscope at a magnification of 100×, the coatings appeared smooth with no pinholes, no mud-cracks and no blisters. Tape adhesion tests (using 3M Scotch Flat Back 1" wide masking tape) on dry coated boards resulted in no paint peeling, which suggests an excellent adhesion of the films to the fiber cement substrate through the cross-linking reaction. The same tape-adhesion tests on damp coated boards (after soaking in tap water for 24 hours at room temperature conditions) confirmed the excellent adhesion with paint pickings of only about 0-5% (per total paint area tested). In addition, surprisingly, the tape-adhesion pickings of damp coated boards were only about 10-15% even after 50 cycles of freeze thaw. The control samples coated with sealers without the cross-linking agent would peel 20% and 40% of the paint in the dry and wet tape adhesion test, respectively. 50 to 70% of the paint would be peeled off after 50 cycles of freeze/thaw testing. Table 1 shows the paint adhesion results of one embodiment compared against paint adhesion of a control sealer.

EXAMPLE 2

Coating Composition Cross-Linkable to Fiber Reinforced Cement. The Coating Composition Comprises a Water-Based Epoxy Sealer and a Water-Based Acrylic Latex Topcoat Example 2 provides a coating composition of another preferred embodiment suitable for cross-linking fiber cement substrates and a method of coating the composition containing cross-linking agents onto fiber cement substrates. The coating composition comprised an epoxy-tertiary amine emulsion sealer and an acrylic latex topcoat. The water-based sealer mixture was prepared by mixing a tertiary polyamine catalyst, POLYCAT 41 obtained from Air Products into an epoxy emulsion resin, ANCAREZ AR550 obtained from Air Products. The POLYCAT 41 catalyst was usually added at 2-10% to the ANCAREZ AR 550 resin, containing about 57% solids epoxy. The topcoat was an acrylic latex coating, containing about 50-54% solids with about 2-4% of a polycarbodiimide cross-linking agent. The acrylic polymer chains also possessed carboxylic acid end groups cross-linkable to the epoxy sealer.

A preferred procedure for creating coatings cross-linking fiber cement substrates using epoxy-tertiary amine sealer and acrylic latex topcoat can be proceeded as follow. First, the emulsion mixture of ANCAREZ AR550 and POLYCAT 41 was brushed onto the fiber cement boards precut to 3" by 3", presoaked to about 20% moisture content and preheated to about 130-140 F to achieve a dry film thickness of about 0.6 to 0.8 mils. The sealer was allowed to soak in for about 20-30 seconds, and then cured until board surface temperature reached about 170-180 F. Subsequently, sealed samples were cooled to room temperature under ambient conditions, followed by the application of two layers of acrylic topcoat similar to those shown in Example 1. Heat cure was used to speed up the self cross-linking reaction of the topcoat, and also to facilitate the bond/cross-linking reaction between the epoxy sealer and the acrylic topcoat. Once the coating was completed, coated boards were allowed to further equilibrate/cure at room temperature conditions for an additional one week before inspection/analysis.

Inspections revealed smooth and non-tacky paint films on the fiber cement substrates. In addition, no pinholes, mud-cracks, or blisters were detected.

Tape adhesion tests indicated a superb adhesion of the cross-linking coating to the fiber cement substrate. No paint pickings were observed for both dry and damp boards before freeze thaw. Surprisingly, there were no picking even after 100 cycles of freeze thaw. Table 2 illustrates the paint adhesion results of one embodiment as compared against paint adhesion results of a control sealer.

TABLE 1

Paint Adhesion with Control Sealer & Epoxy Sealer w/Cross-Linking Agent

| % of Paint Peeled | Control Sealer | Sealer w/Cross-Linking Agent |
| --- | --- | --- |
| Dry Adhesion | 0 to 5 | 0 |
| Wet Adhesion | 40 to 60 | 0 to 5 |
| Wet Adhesion at 50 F/T Cycles | >60 | 10 to 15 |

TABLE 2

Paint Adhesion with Control Sealer & Epoxy Sealer w/Cross-Linking Agent

| % of Paint Peeled | Control Sealer | Sealer w/Cross-Linking Agent |
| --- | --- | --- |
| Dry Adhesion | 0 to 5 | 0 |
| Wet Adhesion | 40 to 60 | 0 to 5 |
| Wet Adhesion at 50 F/T Cycles | >60 | 10 to 15 |

EXAMPLE 3

Coating Composition Cross-Linkable to Fiber Reinforced Cement Comprising a Water-Based Epoxy Sealer and a Water-Based Acrylic Latex Topcoat Example 3 presents yet another preferred embodiment of cross-linkable coating composition based on a different water-based epoxy sealer and the acrylic topcoat. In this example, the water-based epoxy sealer was prepared by adding about 2-5% of a glycidoxypropyltrimethoxysilane DYNASYLAN obtained from Degussa and about 1-3% of a polyamine curing agent, ANQUAMINE 401 obtained from Air Products to the ANCAREZ AR5550 epoxy resin. The acrylic topcoat used in this example was identical to that used in Example 2. The coating and testing procedures were conducted similarly as those illustrated in Example 2.

Smooth, non-tacky, and defect-free films were also obtained similar to those in Example 2. However, noticeable that the current cross-linking coatings on damp fiber cement substrates completely passed the tape-adhesion test with no pickings even after 260 cycles of freeze thaw. Table 3 illustrates the paint adhesion results of one embodiment as compared against paint adhesion of a control sealer.

TABLE 3

Paint Adhesion with Control Sealer & Epoxy Sealer w/Cross-Linking Agent

| % of Paint Peeled | Control Sealer | w/Epoxy Sealer |
|---|---|---|
| Dry Adhesion | 0 to 5 | 0 |
| Wet Adhesion | 40 to 60 | 0 |
| Wet Adhesion at 260 F/T Cycles | >60 | 0 |

EXAMPLE 4

Coating Composition Cross-Linkable to Fiber Reinforced Cement Comprising a Weak Carboxylic Acid Pre-sealer, a Styrene-Acrylic Latex Sealer and an Acrylic Latex Topcoat Example 4 discloses yet another preferred coating composition cross-linkable to cement in general, and to fiber reinforced cement composites in specific. The coating composition comprised a dilute aqueous solution of citric acid as the pre-sealer and a styrene modified acrylic latex as the sealer. The coating composition further comprised an acrylic coating as the topcoat. The aqueous citric acid sealer was prepared by dissolving about 7-12% of an anhydrous solid citric acid obtained from EMD chemicals in tap water. The styrene modified acrylic sealer was diluted with tap water to achieve 15-25% solids. The topcoat used in this example was similar to that used in Example 2.

The cross-linkable coating was produced by first pre-sealing the fiber cement samples with the aqueous acid sealer and curing the pre-sealed samples in a convection air over at about 350 F for 45 minutes. The typical dry film thickness of citric acid was about 0.25-0.45 mils. After the heat cure period, citric acid was expected to completely react/cross-link with the fiber cement materials via an acid-base reaction and/or a carboxylic acid-hydroxyl condensation reaction. Once pre-sealed boards had cooled to about 130-140 F, the sealer was brushed on at a dry film thickness of about 0.6-0.8 mils and allowed to soak in for about 1-2 minutes. Subsequently, two coats of acrylic topcoat were applied and cured similar to the procedure shown in Example 2.

The resultant coatings were smooth, non-tacky and free of film defects. The crosslinking coatings adhere strongly to the fiber cement substrates with no tape-adhesion pickings on both dry and damp coated boards. More superbly, the coatings showed no wet-adhesion pickings (tape-adhesion test on a damp board) even after 75 cycles of freeze thaw. Table 4 illustrates paint adhesion test results of one embodiment using citric acid pre-sealer as compared to test results using a control sealer.

TABLE 4

Paint Adhesion with Citric Acid Pre-Sealer

| % of Paint Peeled | Control Sealer | w/Citric Acid Pre-Sealer |
|---|---|---|
| Dry Adhesion | 0 to 5 | 0 |
| Wet Adhesion | 40 to 60 | 0 |
| Wet Adhesion at 100 F/T Cycles | >60 | 0 |

The citric acid in this example serves as the cross-linking agent between the fiber reinforced cement substrate and the styrenated acrylic sealer. In certain preferred embodiments, the application of the citric acid pre-sealer as a cross-linkable composition advantageously provides excellent paint adhesion to sanded fiber cement substrates in particular.

The presence of the cross-linked interfacial zone correlates with improved adhesion of coatings to the substrate following freeze/thaw cycles. The coating also contains cross-linking agents which can form bonds with polymers in subsequent coating layers. Advantageously, the coated composite building products of the preferred embodiments of the present invention, as compared with similar sheets prepared using traditional surface coatings, present an improved adhesion between coatings and substrate and also between coating layers. The addition of a cross-linked interfacial zone imparts to the composite article superior dry and wet coating adhesion, a reduced propensity to weathering, especially freeze/thaw damage, when compared to existing fiber cement products, improved heat resistance, toughness, scratch and impact resistance, excellent acid and alkaline and chemical resistance.

Although the foregoing description of the preferred embodiments of the present invention has shown, described and pointed out the fundamental novel features of the invention, it will be understood that various omissions, substitutions, and changes in the form of the detail of the invention as illustrated as well as the uses thereof, may be made by those skilled in the art, without departing from the spirit of the invention. Particularly, it will be appreciated that the preferred embodiments of the invention may manifest itself in other shapes and configurations as appropriate for the end use of the article made thereby.

What is claimed is:

1. A building article comprising:
    a substrate comprising fiber cement having a porosity of about 2% to about 80% by volume, wherein the fiber cement contains in the range of from about 2 to about 80% by volume of cement, from about 30 to about 70% by volume silica, and from about 1 to about 15% cellulose pulp, and wherein the substrate contains hydroxyl functional groups;
    a first composition coated over at least a portion of the substrate, wherein a portion of the first composition extends into a subsurface region of the substrate, said first composition comprising a water-based epoxy sealer having a plurality of cross-linking molecules wherein each molecule has at least two reactive functional groups, each functional group being capable of forming chemical bonds with the hydroxyl functional groups in the substrate; and a first cross-linked interfacial zone comprising an interlocking matrix formed in the subsurface region of the substrate, said interlocking matrix comprising hydroxyl functional groups in the subsurface region bonded to and cross-linked by the cross-linking molecules in the portion of the first composition.

2. The building article of claim 1, further comprising a second composition coated over at least a portion of the first composition.

3. The building article of claim 2, further comprising a second cross-linked interfacial zone formed at the interface between the first and second compositions.

4. The building article of claim 3, wherein the second interfacial zone is formed by cross-linking at least two secondary functional groups in the first composition with functional groups in the second composition, wherein said second composition is formed on an upper surface of the first composition.

5. The building article of claim 3, wherein molecules in the second composition are cross-linked by and bonded to secondary functional groups in the first composition.

6. The building article of claim 3, wherein the first composition is a basecoat and the second composition is a topcoat.

7. The building article of claim 3, wherein said second composition has a different composition than the first composition.

8. The building article of claim 1, wherein the building article is selected from the group consisting of cladding panels, sheets, boards, fascia, trim, fencing, roofing, planks, trims, shakes, and pipes.

9. The building article of claim 1, wherein the first interfacial zone is between about 10 and 50 microns thick.

10. The building article of claim 2, wherein the second interfacial zone is between about 10 and 50 microns thick.

11. The building article of claim 1, wherein the water-based epoxy sealer comprises an epoxy-tertiary amine emulsion sealer.

12. A composite building article having a first zone which comprises fiber reinforced cement, a second zone which comprises predominantly a base coat material, and a first interfacial zone interposed therebetween, said first interfacial zone comprising an interlocking matrix formed of a portion of the basecoat material and the fiber reinforced cement, wherein the fiber reinforced cement has a porosity of about 2% to about 80% by volume and contains in the range of from about 2 to about 80% by volume of cement, from about 30 to about 70% by volume silica, and from about 1 to about 15% cellulose pulp, and wherein the base coat material comprises a water-based epoxy sealer having molecules, each molecule having at least two primary functional groups, wherein the primary functional groups bond with functional groups in the fiber reinforced cement substrate to form cross-linking bonds in the interfacial zone.

13. The composite building article of claim 12, further comprising a second interfacial zone formed by cross-linking at least two secondary functional groups in the base coat material with functional groups in a second coating material, wherein said second coating material is formed on an upper surface of the base coat material.

14. The composite building material of claim 12, wherein said second coating material has a different composition than the base coat material.

15. The composite building article of claim 12, wherein the composite building article is selected from the group consisting of cladding panels, sheets, boards, fascia, trim, fencing, roofing, planks, trims, shakes, and pipes.

16. The composite building article of claim 12, wherein the first interfacial zone is about 0 to 50 microns thick.

17. The composite building article of claim 12, wherein the second interfacial zone is about 0 to 50 microns thick.

18. The composite building article of claim 12, wherein the water-based epoxy sealer comprises an epoxy-tertiary amine emulsion sealer.

19. A method of forming a building article, comprising:
applying a first composition comprising an epoxy-based sealer to an exterior surface of a fiber cement substrate having a porosity of about 2% to about 80% by volume and containing in the range of from about 2 to about 80% by volume of cement, from about 30 to about 70% by volume silica, and from about 1 to about 15% cellulose pulp, wherein a portion of said first composition extends into a subsurface region of the substrate in a controlled manner; and
reacting the portion of said first composition with molecules in the subsurface regions in a manner so as to form a cross-linked interfacial zone.

20. The method of claim 19, wherein applying the first composition comprises applying more than one layer of coating composition.

21. The method of claim 19, wherein the water-based epoxy sealer comprises an epoxy-tertiary amine emulsion sealer.

* * * * *